United States Patent [19]

Stein et al.

[11] Patent Number: 5,793,951
[45] Date of Patent: Aug. 11, 1998

[54] SECURITY AND REPORT GENERATION SYSTEM FOR NETWORKED MULTIMEDIA WORKSTATIONS

[75] Inventors: Michael Victor Stein, San Jose; Paul Richard Wenker, Milpitas, both of Calif.

[73] Assignee: Apple Computer, Inc., Cupertino, Calif.

[21] Appl. No.: 644,494

[22] Filed: May 10, 1996

[51] Int. Cl.⁶ .................................................. G06F 11/00
[52] U.S. Cl. ............................ 395/187.01; 395/188.01
[58] Field of Search ......................... 395/187.01, 186, 395/188.01; 364/479.07; 380/23, 24, 25; 711/114

[56] References Cited

U.S. PATENT DOCUMENTS

| | | | |
|---|---|---|---|
| 5,204,966 | 4/1993 | Wittenberg et al. | 395/188.01 |
| 5,222,135 | 6/1993 | Hardy et al. | 380/4 |
| 5,426,421 | 6/1995 | Gray | 340/825.06 |
| 5,434,918 | 7/1995 | Kung et al. | 380/25 |
| 5,457,746 | 10/1995 | Dolphin | 380/4 |
| 5,548,721 | 8/1996 | Denslow | 395/187.01 |
| 5,586,322 | 12/1996 | Beck et al. | 395/616 |
| 5,630,115 | 5/1997 | Takaya et al. | 397/617 |
| 5,636,280 | 6/1997 | Kelly | 380/4 |
| 5,671,354 | 9/1997 | Ito et al. | 385/187.01 |

*Primary Examiner*—Albert Decady
*Attorney, Agent, or Firm*—Burns, Doane, Swecker & Mathis, L.L.P.

[57] ABSTRACT

A method for providing security in a networked multimedia computing system is provided wherein an administrative workstation is challenged by a network workstation when the administrative workstation is attempting to manipulate or query the network workstation. The administrative workstation responds in an automatic fashion to supply a series of logically acceptable password candidates to the challenging workstation in an attempt to validate itself to the challenging network workstation without interrupting a user. If none of the series of passwords is successful, an administrator, or user, operating the administrative workstation is prompted to manually enter a password. The system allows for an administrative workstation to automatically and transparently validate itself to a challenging network workstation, in most situations, without requiring input from the administrator. Another aspect of the invention involves a system for generating reports concerning user-selected hardware and software attributes for one or more network workstations.

25 Claims, 16 Drawing Sheets

| Name | Item | Kind | Version | Difference |
|---|---|---|---|---|
| Altair | EM Extension | system extension | n/a | Not installed |
| Altair | Acrobat Reader 2.0.1 | application program | n/a | Not installed |
| Altair | Administrator Installer | application program | n/a | Not installed |
| Altair | CD-ROM | system extension | 4.0.2 | Older version |
| Altair | Guide | system extension | n/a | Not installed |
| Altair | Photo Access | system extension | 1.0.2 | Older version |
| Altair | Video Player | application program | n/a | Not installed |
| Altair | CD Audio Player | application program | n/a | Not installed |
| Altair | ScriptLib | system extension | n/a | Not installed |
| Altair | Script | system extension | 1.0 | Older version |
| Altair | Share | system extension | 7.1 | Newer version |
| Altair | Event Manager | system extension | 1.0.1 | Extra |
| Altair | Startup | system extension | n/a | Not installed |
| Altair | Audio CD Access | system extension | 4.0.2 | Older version |
| Altair | Bailey's Book House | application program | n/a | Not installed |

1 Workstation     85 Items     0 Selected
Last update: Tue, Jan 2, 1996 3:27 PM

FIG. 13

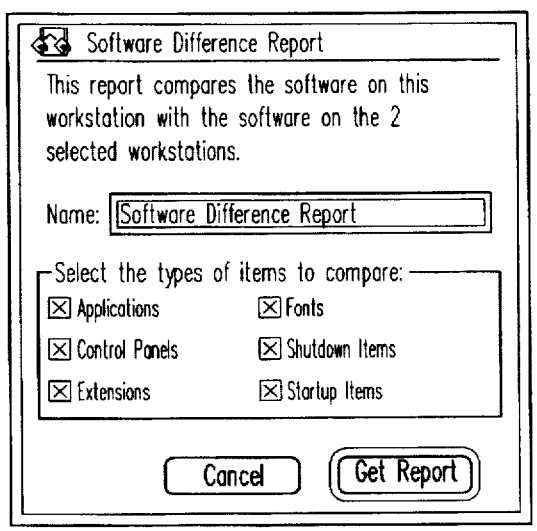

FIG. 14

| Workstation | Item | Kind | Version | Difference |
|---|---|---|---|---|
| Rigel VII | MacBench 2.0 | application program | 2.0 | Extra |
| Rigel VII | ResEdit | application program | 2.1.1 | Older version |
| Rigel VII | Adobe Sans MM | font | n/a | Not installed |
| Rigel VII | eWorld Fonts | font | n/a | Extra |
| Rigel VII | Video Player | application program | 1.3b4 | Older version |
| Rigel VII | Tips & Tricks, 12/92 | application program | 3.9.2 | Newer version |
| Rigel VII | Tips & Tricks, 11/92 | application program | 3.9.2 | Newer version |

3 Workstations   732 Items   0 Selected
Last update: Thu, Apr 4, 9:56 AM   Update

FIG. 15

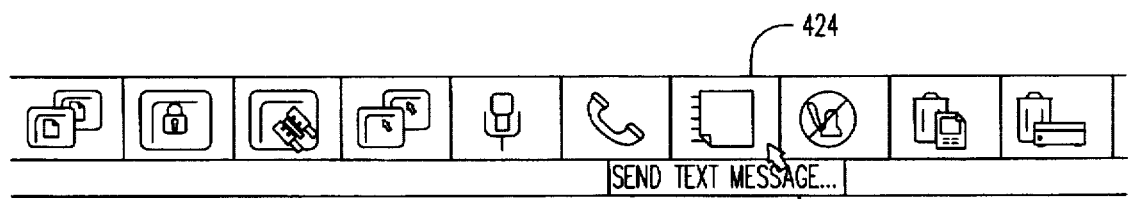

FIG. 16

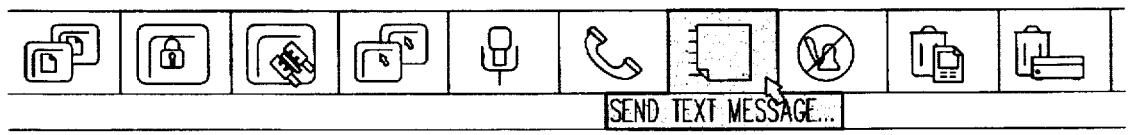

FIG. 17

SECURITY AND REPORT GENERATION SYSTEM FOR NETWORKED MULTIMEDIA WORKSTATIONS

FIELD OF THE INVENTION

The present invention is directed to networked computer workstations, and more specifically to a system for providing workstation security while maintaining an efficient and user-friendly operating environment.

BACKGROUND OF THE INVENTION

With the increased processing power available on desktop computers and the expanding use of various types of media to present information, computer systems have been developed which combine these two technologies in a network that can selectively distribute audio-visual information from any of a number of sources to individual workstations on the network. Examples of such systems are disclosed in commonly assigned copending U.S. patent application Ser. Nos. 08/207,779, now abandoned and 08/207,957, now application Ser. No. 08/698,779, filed Mar. 8, 1994, the disclosures of which are incorporated herein by reference. Generally speaking, the systems disclosed in these applications comprise a number of multimedia workstations and a plurality of audio-visual sources that are connected to one another over two parallel networks. A multichannel A/V network delivers audio-visual information from the sources to the various workstations. A digital data network transmits data and control information between the various workstations, as well as from the workstations to the audio-visual sources.

An arrangement of this type offers a number of features that are particularly useful in classrooms and other educational environments. For example, a teacher can make an announcement to any number of selected students, and can carry on a two-way conversation with any given student. The teacher and the students can watch videos from a multiplicity of different sources, and the teacher can remotely control individual student workstations to receive the video information from a particular source. The teacher is provided with the ability to observe student workstations within a working space on the teacher's display screen, as well as to control the operation of any particular workstation. For further information regarding the details of such a system, reference is made to the previously cited patent applications.

In previous applications of the aforementioned systems, such networks have typically been limited to a single classroom, or like setting. Legitimate administrative access to network workstations is not generally an issue in such an environment because the individual performing the administrative functions (e.g., the teacher) is usually operating a master workstation within the same room. Since security is ordinarily not an important issue in such a network environment, conventional systems assume that a message originating from a master workstation are inherently valid. In such a situation, the only security provided is a password prompt to invoke administrator's software associated with a master workstation. There are generally no additional checks to ensure that a workstation requesting administrative access is authentic. Because the classroom or lab involved with such a situation is relatively confined, administrators need not be concerned with any higher degree of security. As networks expand to multiple rooms, or even outside of a building, network workstations can be more vulnerable to sophisticated modes of attack such as impersonating an administrator.

Because the network workstations become more vulnerable to attack as a network expands beyond a classroom or lab, it is desirable to have an additional security mechanism beyond source address checking. One possibility is to require administrator validation through password entry each time an administrative function or session is initiated. However, as networks grow and the sophistication of administrative tasks expand, requiring the administrator to enter a password every time an administrative task is performed becomes unduly burdensome. More desirable is a security system for automatically authenticating a legitimate administrator to a network workstation in a fashion that does not interrupt the administrator or require action on the administrator's part unless necessary.

Another shortcoming in conventional systems is the inability of an administrator to quickly and efficiently gather information concerning various attributes of network workstations in the network. On a one-on-one basis, it is a fairly simple task to gain access to a network workstation to manually investigate and gather desired information. However, as the size of networks of the type described above grows, determining the software and hardware attributes of the network workstations can be a daunting task if performed on a machine-by-machine basis. Hence, it is desirable to be able to assess the hardware and software configuration status of network workstations without having to engage the administrator in the tedious task of forming connections with individual workstations for the purpose of gathering needed information.

BRIEF STATEMENT OF THE INVENTION

The present invention provides a system for automated security that protects network workstations from unauthorized access and manipulation by purported master workstations. The invention can be applied in a networked computer system having at least one master workstation and a plurality of network workstations, wherein in response to a denial of access by the network workstation, the master workstation automatically sends one or more password candidates to the network workstation in a fashion that is transparent to a user.

A security system according to the present invention is useful in a number of situations. In a first potential scenario, a network workstation monitors receipt of administrative status request messages to evaluate the continued presence of a master workstation on the network. If the network workstation senses that the master workstation has dropped out or been cut off, further requests received from the master workstation are challenged by requesting the master workstation to validate itself before the network workstation responds to the status request. Validation, in accordance with an exemplary embodiment of the invention, involves automatically and transparently sending a series of logically acceptable passwords to the challenging workstation in a manner that is transparent to an administrator operating the master workstation.

In a second potential scenario incorporating the invention, a network workstation may challenge a request to perform an administrative task or function by requesting that the master workstation first validate itself to the challenging workstation before the task will be considered. Response by the master workstation involves automatically and transparently sending one or more logically acceptable passwords to the challenging workstation to validate the master workstation. Such a system has the desirable attributes of enabling the task without interrupting the administrator operating the master workstation.

Further provided is an automated system for generating workstation hardware and software information reports. Such an information report system allows an administrator to gather pertinent data concerning various attributes of one or more network workstations in a simple fashion. The information report request messages are queued by the receiving workstations, if necessary, and are addressed during idle processing periods. The master workstation correlates return data into a report that is displayed to the administrator.

These and other features of the present invention, and the advantages offered thereby, are explained in detail hereinafter with reference to specific embodiments illustrated in the accompanying drawings.

BRIEF DESCRIPTION OF THE DRAWINGS

FIG. 13 is an example of a software difference report;

FIG. 14 is a Software Difference Report request dialog box having additional comparison items indicated;

FIG. 15 is an example of a software difference report having an update button;

FIG. 16 is an illustration depicting a cursor indictor placed over an icon thereby exposing the full description text for the icon;

FIG. 17 is an illustration depicting the selection of the icon in FIG. 16;

DETAILED DESCRIPTION

To facilitate an understanding of the present invention, its features are described hereinafter with reference to a particular implementation, namely a multimedia computer network that is designed for a classroom or computer laboratory environment, in which a teacher or administrator operates a master workstation and students are located at a multiplicity of other workstations. It will be appreciated, however, that the practical applications of the invention are not limited to this particular environment. Rather, it will be found to have utility in any situation in which a designated master workstation can exert control over, or otherwise interact with, a set of network workstations. For example, it might be employed in a business office environment, where a system administrator controls network workstations of various office personnel.

Figure 1:
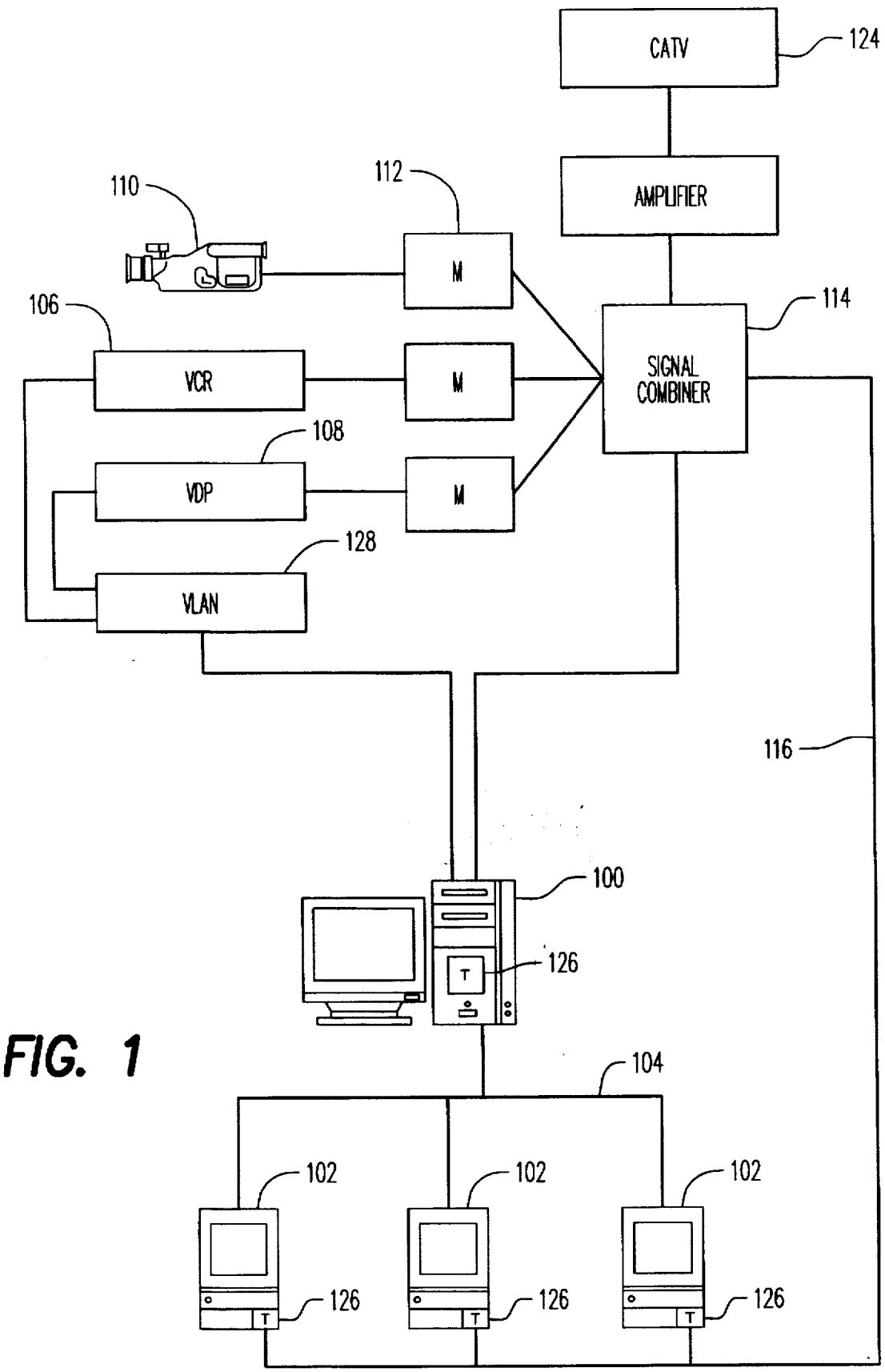
FIG. 1 is a block diagram of the hardware architecture of a networked computer system of a type to which the present invention can be applied.

One example of a hardware configuration for a networked multimedia system, of a type to which the present invention can apply, is illustrated in FIG. 1. Referring thereto, the system contains a number of workstations, including a master workstation 100 at the disposal of an administrator, and a multiplicity of other workstations 102 that are accessible to other users, for example, students. Each workstation includes a central processing unit (CPU) with associated memory, some form of permanent storage, such as a hard disk or read-only memory (ROM), and a monitor which provides a display screen for viewing the work being performed at the workstation. In a typical classroom or laboratory setting, all of the workstations might be located in one room. In other settings, however, the workstations can be located in different rooms, and possibly different buildings or cities.

The various workstations are connected to one another by means of a suitable conventional data network 104 such as, for example, an Ethernet network. The data network 104 enables digital data to be exchanged between the various workstations. Examples of this digital data include digitized audio information, which permits the students and the administrator to communicate with one another, as well as screen data which enables the information presented on the screen of one workstation to be displayed on the monitors of other workstations.

Also included within the system are a plurality of audio-visual (AV) sources. In the particular example illustrated in FIG. 1, the AV sources include a video cassette recorder 106, a video disk player 108 and a video camera 110. Each of these sources is connected to an associated modulator 112, and the signals from the modulators are presented to a signal combiner 114. Analog video information from each of the video sources is distributed to the various workstations, through the signal combiner 114, by means of a multifrequency network 116. The multifrequency network 116 can be a CATV network, for example. In operation, the analog video information from each of the sources is amplified and translated into a television channel signal by their respective modulators 112. These signals are combined and distributed to the workstations on respective television channels. In addition to the discrete sources, the network 116 also can be connected with a commercial cable television service 124, an antenna and/or a satellite dish, to provide additional television signals. Utilizing this approach, well over one hundred different channels of information can be sent to each workstation.

Each workstation is provided with a television tuner 126. Through control provided locally at the student's workstation or remotely from the teacher's workstation, these tuners can select a particular channel for transfer into an audio-visual subsystem of the workstation. The audio-visual subsystem converts the analog video and audio information into suitable signals that are processed within the workstation and presented to the user.

A video network controller 128 is connected to the master workstation 100, to permit the teacher to control the individual video sources. This controller allows the teacher to send control commands to the various video devices, such as start, stop, fast-forward, etc. These commands are provided to the individual video devices through a suitable remote control interface.

At each workstation, a student can choose a video source such as a cable network or a local device, select a particular television channel, and select an audio device (not shown). To remotely control any of these devices, a student's workstation 102 can send a request to the teacher's workstation 100, which then communicates with the video network controller 128, to transmit control signals to the video device. A suitable arbiter can be employed to prevent more than one user from controlling a video device at a time. For further information regarding the details of a system of the type illustrated in FIG. 1, reference is made to the previously cited patent applications.

Figure 2:
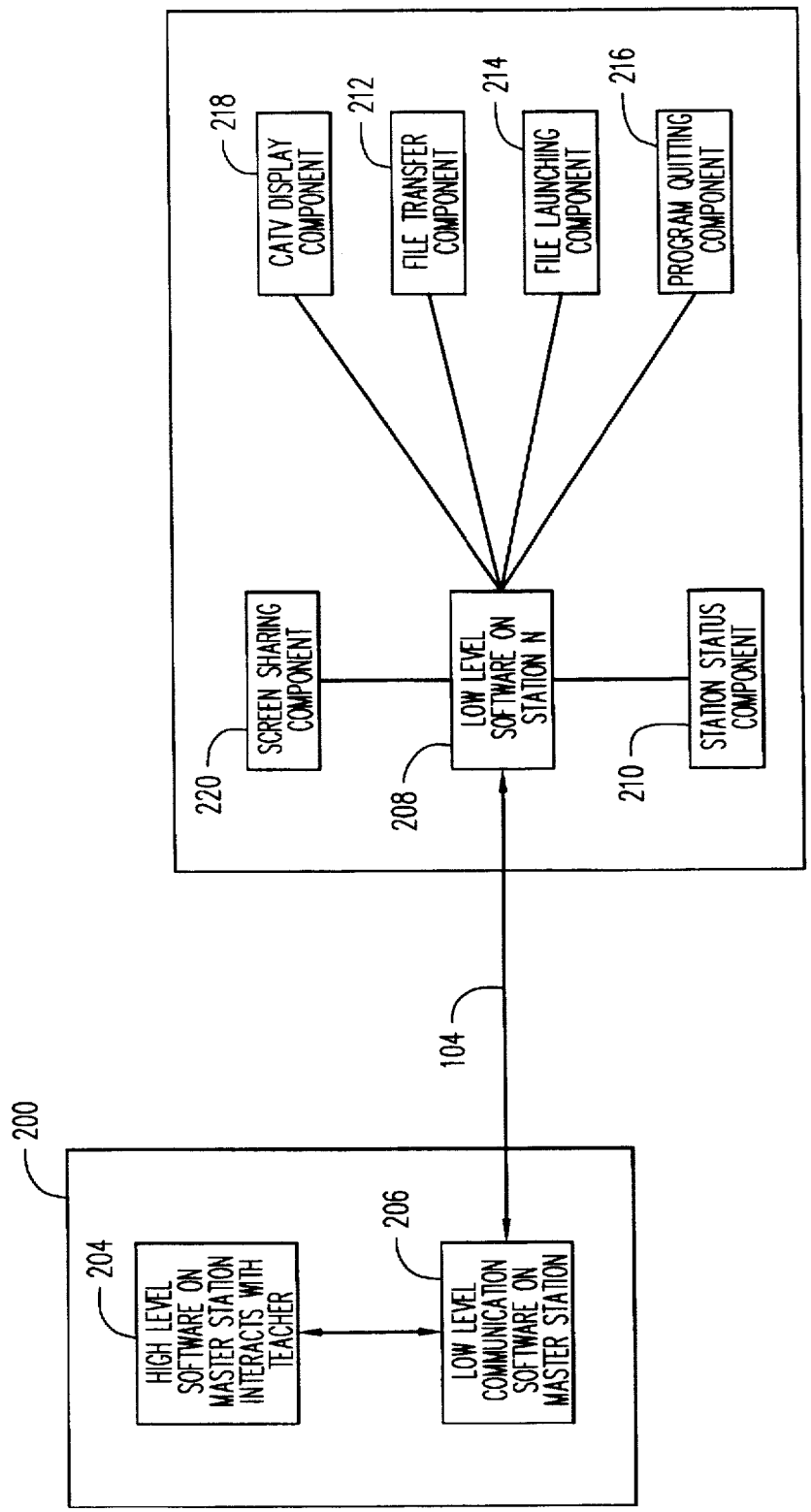
FIG. 2 is a block diagram of the software architecture for such a system.

The architecture of the software for performing these functions, as well as additional functions described hereinafter, is illustrated in block diagram form in FIG. 2. Referring thereto, the software 200 located on the teacher's workstation permits the teacher to interact with the various student workstations, controlling their video displays and handling audio communications. This software can be classified into two main parts. High level software 204 interacts with the administrator, permitting the administrator to issue the commands for controlling the network workstations. Low level communication software 206 communicates these commands to the various network workstations over the digital data network 104.

Each of the network workstations 102 also includes low level communication software 208 for handling communications between the administrator and the network workstation 102 over the digital data network 104. In response to commands received over the digital data network from the master workstation, various other software components are called to perform certain tasks. A station status component 210 reports the current status of the workstation, when prompted by the master workstation. A file transfer component 212, a file launching component 214, and a program quitting component 216 respectively handle the receipt, launching and termination of documents and applications on the network workstation, in response to commands from the master workstation. A CATV display component 218 provides a television display for the network workstation. It also permits a network workstation user to capture video information, and control remotely located video devices connected to the master workstation. A screen sharing component 220 processes data pertaining to the information being displayed on the network workstation's screen, and furnishes this data to the master workstation. One example of a suitable screen sharing application is the Timbuktu product developed by Farallon Computing, Inc. of Alameda, Calif.

While the network described above is directed to a typical classroom setting, as mentioned briefly, networks of this type can be expanded to encompass much larger areas. When the network is expanded in such a way, new considerations come into play. One of these considerations is security. As a network expands across wide boundaries, the network workstations may become more susceptible to remote attack. Such an attack can involve a hacker attempting to impersonate a master workstation, or attempting to perform administrative functions.

In controlling a network workstation, the nature and level of command and control over a network workstation from a master workstation depends on a level of access granted by the network workstation when the network workstation is attached to the network (i.e., in the set up process). In a private setting, such as a computer lab in a classroom, an administrator typically sets up all of the network workstations and permits the master workstation to have a high level access to each network workstation. However, in a public network environment, a user attaching a workstation to the network may choose to grant only a limited amount of access to the workstation by a network administrator. In either case, a master workstation may have to validate itself to the network workstation to perform some administrative operations.

In accordance with exemplary embodiments of the present invention, the master workstation, when presented with a validation challenge by a network workstation upon which the master is attempting to perform administrative functions, automatically and transparently supplies one or more logically acceptable password candidates to the network workstation.

In accordance with one embodiment of the invention, network workstations monitor periodic status request messages from the master workstation. This has the effect of informing the network workstation that a link with the master workstation remains active. This procedure, of course, also allows the master workstation to remain apprised of the status of network workstations. If a network workstation does not receive a status request message from the master workstation for a prolonged period of time, the network workstation assumes that the master workstation, or a network link therebetween, has become idle or disabled. Thereafter, the network workstation challenges subsequent inquiries in order to force the master workstation to re-validate itself to the network workstation. Of course, a network workstation can always challenge inquiries, or challenge inquiries based on the level of access or control an inquiry seeks to exert. An exemplary network workstation security mechanism in the context of a status update process is described in greater detail as follows.

In an exemplary system incorporating the invention, the master workstation periodically broadcasts status request messages to all network workstations. In an alternative arrangement, the master workstation may broadcast messages to all network workstations within, for example, a defined zone. A master workstation also may devise a most efficient route by which to send a packet to all of the workstations within the defined zone. The status request messages solicit the network workstations to send a response that indicates the network workstation's current status. The response can include the name of the network workstation and information concerning an application presently active on the network workstation.

In accordance with preferred embodiments, when a status request message is received by a network workstation, it is not necessarily acted upon immediately, but rather is queued by the network workstation and addressed when the network workstation becomes idle. Consequently, normal workstation operations are not interrupted, or delayed, by virtue of having to perform the investigative tasks associated with responding to the status request message. Of course, if the network workstation is idle when the status request message is received, the status request can be immediately addressed. After the status information is gathered, it is reported to the master workstation in the form of a status response message. Because several or all network workstations on a network receive status request messages, it is desirable to invoke a mechanism to stagger responses so as to avoid consuming network bandwidth. For instance, responses can be staggered by having network workstations wait for a brief, randomly selected period of time before transmitting a response.

Figure 4:
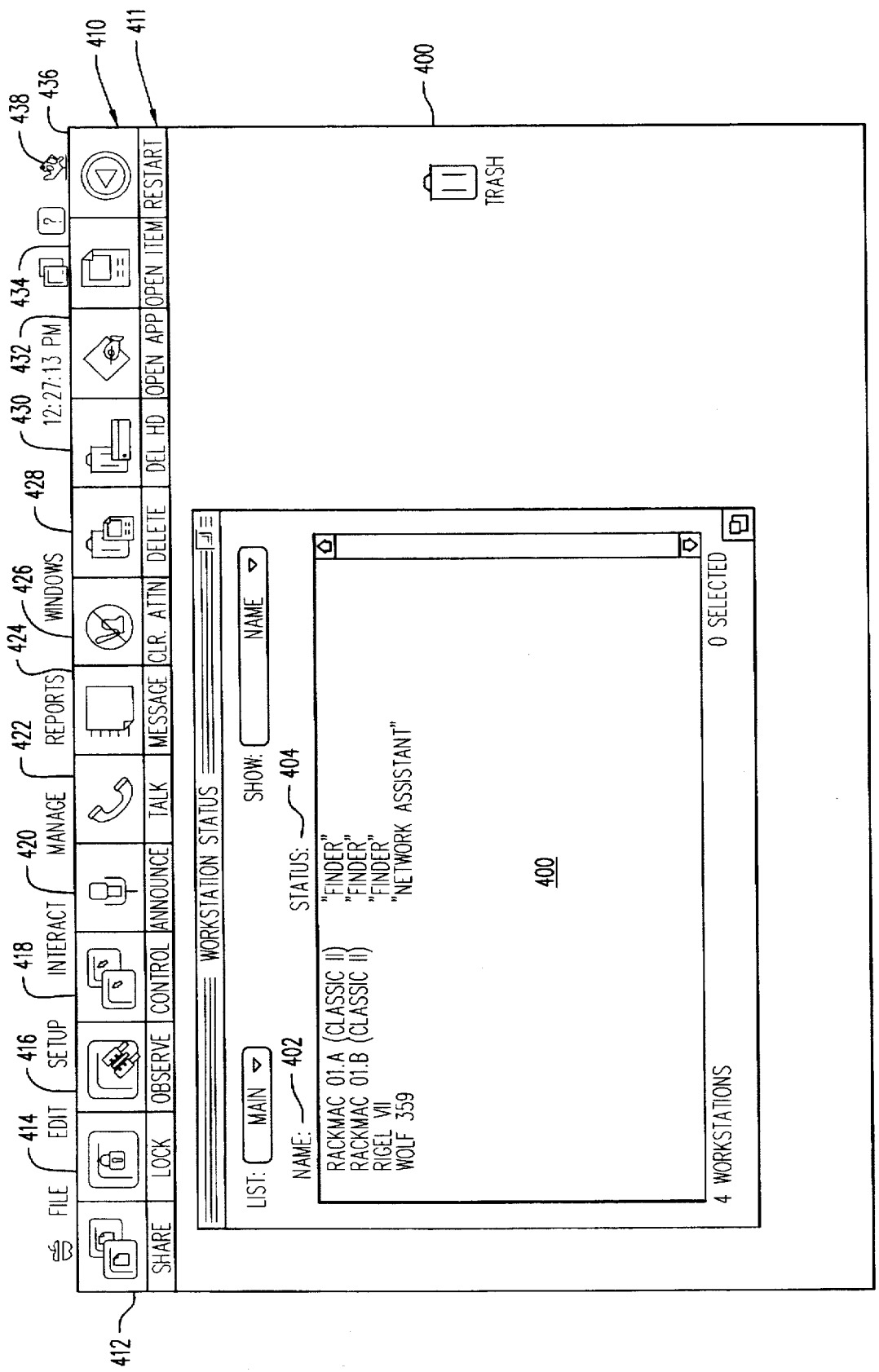
FIG. 4 is an illustration of a master workstation display screen showing the workstation status window and a toolbar conforming to an exemplary embodiment of the invention.

The master workstation records the results of the status response messages returned by the network workstations, so that an administrator can stay apprised of the status of the network workstations. An exemplary workstation status screen is illustrated in FIG. 4. In the figure, a workstation status window 400 shows that four workstations (RackMac 01.A, RackMac 01.B, Rigel VII, and Wolf 359) under the "Name" heading 402, have responded to a status request message. The status of the network workstations is indicated under the "Status" heading 404. The first three named network workstations are actively operating a file management application known as the "Finder," while the fourth network workstation (Wolf 359) is operating a "Network Assistant" application. In accordance with the present invention, the status request messages broadcast by the master workstation also perform the function of informing the network workstations which receive the messages that the master workstation remains active on the network.

In an exemplary embodiment of a system operating in accordance with the invention, a status request message is broadcast by the master workstation periodically, e.g. every four seconds. The probabilities of such a message being received within a short time period after transmission by a network workstation are relatively high. However, if for any reason a status request is not received by a network workstation within a predetermined period of time (e.g., two minutes), the network workstation assumes that the master workstation has shut down, become idle, been cut off, or the like. When this condition is determined, the network workstation invokes a security mechanism wherein the network workstation challenges subsequent inquiries received from the master workstation, or any other source requesting administrative access or information.

When a subsequent status request or other type of administrative message is received by a network workstation that has marked the master workstation as idle, the network workstation responds by issuing a challenge message requesting that the sender re-validate itself to the network workstation. A master workstation operating in accordance with an embodiment of the invention, however, automatically responds in an attempt to re-validate itself to the challenging network workstation before resorting to manual re-validation (i.e., manual password entry). Such automatic re-validation steps are performed in a fashion that is transparent to the person operating the master workstation.

In a preferred embodiment, the network workstation challenges by requesting a password. The master workstation responds to the challenge by automatically supplying a series of passwords that have a high likelihood of being accepted by the network workstation, to re-validate the master workstation. This has the desirable effect of validating the master workstation to the challenging network workstation, without manual input from the administrator. This also avoids unnecessarily interrupting an administrator, if possible, to request entry of a password.

Figure 3:
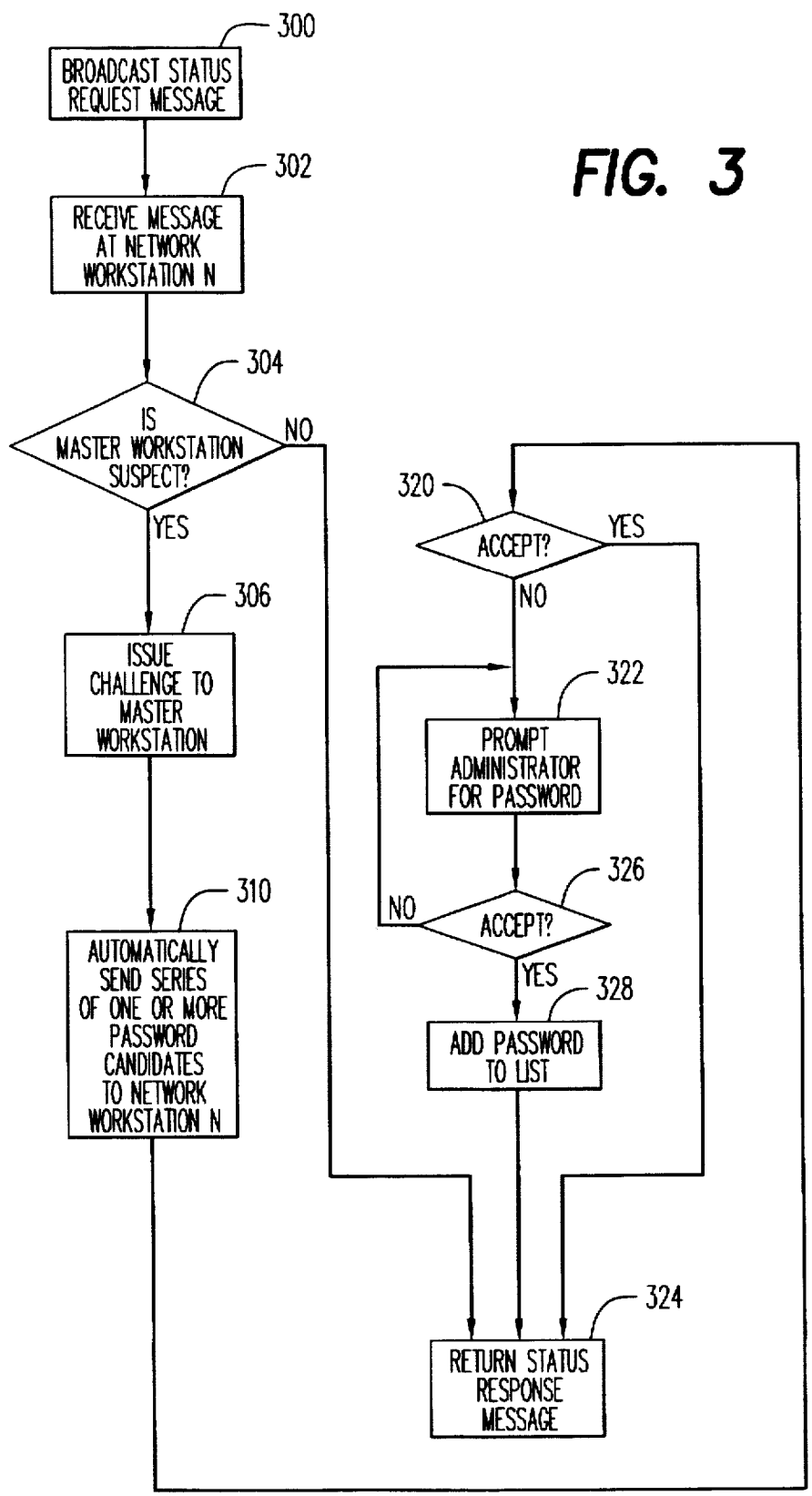
FIG. 3 is a flowchart illustrating a process for automatically validating a master workstation to a network workstation in accordance with an aspect of the invention.

An exemplary process for revalidating the master workstation in the context of a status request is illustrated in FIG. 3. Referring to the figure, a master workstation broadcasts a status request message at block 300. The status request message is received at, for example, network workstation N at block 302. Workstation N then makes a determination as to whether the master workstation should be deemed suspect at block 304. The determination may involve assessing the nature of the request being made. If the request requires that a high level of administrative access be defined, then the network workstation can require that the master workstation validate itself before the command is carried out. In an alternative arrangement, the network workstation can monitor a timer. If the timer expires before the network workstation receives a status request message, the network workstation can raise its guard by challenging a subsequent message allegedly sent by the master workstation. Alternatively, the network workstation can measure an amount of time between the receipt of messages from a master workstation and compare the time measurement with a predetermined threshold. If the threshold is met or exceeded, the network workstation can respond by challenging the master workstation. If the master workstation is not suspect, the network workstation makes an appropriate assessment of its status and returns an appropriate status response message to the workstation (block 324).

If the master workstation is determined to be suspect at block 304, the workstation N responds by forming a challenge response and returning it to the master workstation (block 306). The masterwork station responds by supplying a series of one or more candidate passwords to the network workstation N in an attempt to validate itself to the network workstation N (block 310). The validity of the candidate passwords is assessed at block 320, and if one of the candidate passwords is accepted, the network workstation makes an appropriate assessment of its status and returns an appropriate status response message to the workstation (block 324). If none of the candidate passwords are accepted, the master workstation prompts the administrator to manually enter a password (block 322). If the manually entered password is accepted at block 326 the manually entered password is added to the series of one or more candidate passwords maintained by the master workstation (block 328). In this way the password candidate list can be grown dynamically as explained in greater detail below. If the manually entered password is not accepted at block 326, the administrator can be re-prompted to enter another password. The order of passwords automatically supplied in response to the challenge can, of course, vary.

In an exemplary embodiment of the invention the series of candidate passwords can include a first password that is entered by a user on an individual network workstation (and stored by the master workstation) when the individual network workstation is added to the network. When this password is tendered by the master workstation in response to a validation challenge, the network workstation determines whether the stored password is still recognized (the user may have changed the password in the interim). If not recognized, the next password sent by the master workstation can be a null password (i.e., an empty password field is passed in the password packet). If a null password is not accepted, the master workstation may then try a password stored for the administrator (i.e., the administrator's password). If none of these are successful, the master can then prompt the administrator to manually enter a password to be tendered to the network workstation.

The various passwords that are transmitted from the master workstation to the individual network workstation can be stored in a list associated with that individual network workstation, for example. The first time that a validation procedure is attempted, only two passwords might be stored in the list, such as a first candidate password comprising the stored password for the individual workstation, and a null password. If neither of these passwords is accepted, the administrator can be prompted to enter a password. If the manually entered password is successful, it can be added to the list (e.g., at block 328). Thus, the next time validation is attempted, three passwords will be automatically sent, and the administrator will be prompted to enter a new password only if all three are unsuccessful. Each time a new password is successful in achieving validation, it is added to the list (e.g., at block 328). Thus, the system dynamically adjusts to changing conditions. In most cases, the system automatically re-validates the master workstation to the challenging network workstation without requiring any manual intervention on the part of the administrator.

In some situations, several master workstations can divide responsibilities for monitoring a large number of network workstations on a network. For example, ten master workstations may be responsible for monitoring 100 network workstations (e.g., ten network workstations per master workstation). In such a situation, a status request message broadcast on the network by a particular master workstation is received by all 100 network workstations. The 90 network workstations not within the control of the broadcasting master workstation may deem the broadcasting master workstation to be suspect and respond by issuing challenge message responses. These responses can generate undesirable traffic on the network. Accordingly, pursuant to another aspect of the invention, a request message broadcast by a master workstation can contain a list of network workstations from which the master workstation desires a response. Other, unlisted network workstations, ignore such a request message and fail to issue a challenge thereby avoiding undue burdening of the network.

The security mechanism involved in the status request message system described above corresponds to broadcast message scenario wherein a message is broadcast to all the network workstations. However, many administrative control and maintenance operations involve direct messaging wherein command and control messages sent by the master workstation are directed to specific network workstations. An automated process for authenticating a master workstation to a network workstation also can be used in directed control operations of specific network workstations. As mentioned above, some administrative operations require validation before a network workstation will carry out a task specified within the message. In accordance with embodiments of the present invention, when the administrator seeks to perform an operation that requires authentication, the master workstation performs a series of steps to automatically supply password candidates to a network workstation in a transparent fashion.

Figure 5:
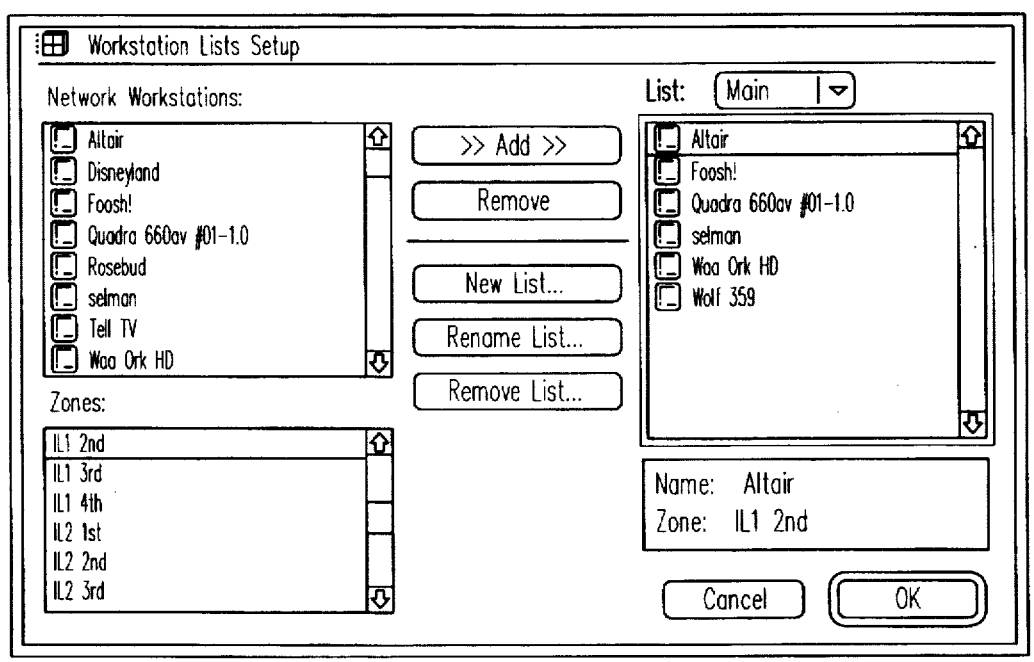
FIG. 5 is an illustration of Workstation List Setup dialog box that illustrates network zones.

An example of a directed administrative control process that can involve automatic validation of a master workstation is the addition of network workstations to the network, or the addition of network workstations into a defined zone within the network. In this respect, reference is made to FIG. 5 wherein a screen is displayed on an administrator's workstation screen for manipulating a network workstation between network zones. In the depicted window, the network workstation "Altair" presently resides in the zone "IL1 2nd".

Consider an example where an administrator attempts to remotely restart Altair. Depending on the level of administrative access that has been defined, Altair may respond to a remote restart command by challenging the master workstation to validate itself before Altair carries out the command. In a response process similar to that illustrated in steps 308 through 324 of FIG. 3, the master workstation systematically supplies a series of passwords, of which at least one is presumably valid, to validate the master workstation to Altair. Of course, step 324 (acceptance of a password candidate) in this case would involve Altair acting in accordance with the administrative request made by the master workstation.

In a network lab setting, such as a classroom, there is a high likelihood that at least one of the systematically supplied passwords will be successful in validating the master workstation to the network workstation. This is because, in such a setting, the administrator is ordinarily the individual who set up the network workstation. However, in a network situation where the network workstation is outside the controlled setting (e.g., a home computer) and was added to the network by a user operating the network workstation, the user may have changed the station's password since originally joining the network. Hence, the password saved by the administrator from the original set up may not be successful in authenticating the master workstation, thereby necessitating manual entry of a password to complete the desired operation. This provides a private user with the ability to flexibly limit administrative access to the workstation.

In an alternative arrangement, a network workstation may wish to communicate with a master workstation that is deemed suspect. Consider the example where a student operating a network workstation wishes to notify an administrator that he or she desires attention. Referring to FIG. 4, an attention indicator 438 notifies an administrator that the user operating a network workstation has requested attention. The administrator can respond by selecting the workstation requesting attention and then selecting, for example, the talk button 422. However, in the event that the master workstation has been deemed suspect, this situation may require that the master workstation first validate itself to the network workstation desiring attention before it can respond to the request. Accordingly, in accordance with another exemplary embodiment of the invention, a network workstation can initiate the challenge response process, thereby preemptively revalidating the master workstation. An exemplary method for doing so can involve issuing a challenge message to the master workstation when the network workstation wants to send a request message, such as an attention request, to the master workstation. The master workstation responds by automatically sending a series of one or more password candidates to the network workstation in response to the challenge message. The password candidates are analyzed by the network workstation to determine whether any are valid. If so, the master workstation is validated, and thereby enabled to respond to the request from the network workstation.

Administrative monitoring of the software and hardware configuration of network workstations conventionally involves investigating individual workstations by inspecting their contents. That is, in prior arrangements the administrator has to gain access to the workstation, and then manually search for the desired information by using find file commands and/or inspecting the drives and set up screens of the workstation. In accordance with another aspect of the invention, a capability is provided that allows an administrator to generate reports that detail hardware and software aspects of network workstations without requiring manual searching of individual workstations. In addition, a report generation capability is provided that permits a comparison of one or more selected software applications on one or more network workstations with the same software applications on the master workstation.

The advantage of a report generation system in accordance with the invention is that an administrator can determine, in a simple manner, the hardware and software configuration of one or more network workstations without having to individually access the workstations. The administrator can set out the particular attributes of the hardware and software that are desired by indicating preferences in a report request screen or dialog box. The dialog box can set out a list of the available network workstations on the network in a addition to the network workstation attributes that the administrator wishes to investigate. Once the dialog box is filled in and the report generation command is activated, a message is built in the master workstation setting out the desired network workstation attributes. The message is sent to the selected network workstations. Once the information is gathered and returned to the master workstation, the information is compiled into a report that allows the administrator to compare and contrast selected software or hardware attributes of the selected workstations. For example, the administrator can request that a report be generated for a selected group of workstations, to identify which versions of a particular application reside on those workstations. The report generated sets out the names of each of the selected workstations and lists the information concerning the selected application(s). Such a report allows the administrator to make assessments without having to manually inspect each individual workstation.

A report generation system in accordance with a preferred embodiment of the invention operates in a manner that is consistent with the status request messaging described above, in that requests are preferably queued by the workstations, if necessary, and addressed when the network workstation is not performing regular tasks. That is, when the selected workstations receive the report request messages, the requests are not necessarily acted upon immediately. Rather, in accordance with preferred embodiments, the network workstations process the requests during periods when the workstation (i.e., its processor) is idle. After the requested data has been gathered, an appropriate response message is formed and sent back to master workstation for compilation into a report.

Figures 6, 7:
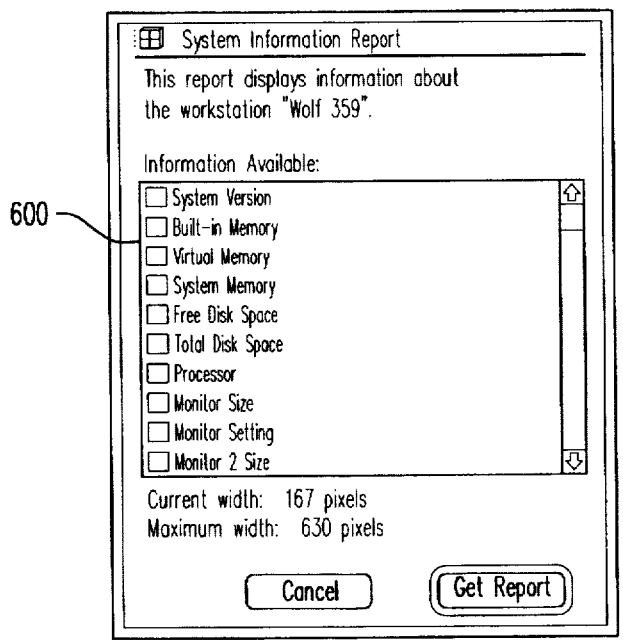
FIG. 6 is a System Information Report request dialog box.
FIG. 7 is an example of a system information report.

Several report types are available in accordance with the invention. A first type is a hardware, or system information, report. Such a report can be requested to determine the configuration of one or more hardware attributes of one or more selected workstations. When an administrator initiates the generation of a system information report for one or more workstations, a window, such as the dialog box window depicted in FIG. 6, is displayed. The dialog box referred to in the figure will be brought up following the selection of one or more network workstations. In this case, only one workstation (i.e., "Wolf 359") was selected. The system information dialog box 600 for the network workstation Wolf 359 indicates hardware attributes for the workstation that can be selected for investigation and depiction in a system information report. The number of items that can be simultaneously displayed may be limited by the available screen width (see for example FIG. 7). Of course, appropriate widthwise scrolling can be provided to simultaneously display are larger number of items in a single report. The system information available can include, but is not limited to: operating system version, built-in memory, virtual memory, system memory, free disk space, total disk space, processor, monitor size, monitor settings, etc.

Figure 8:
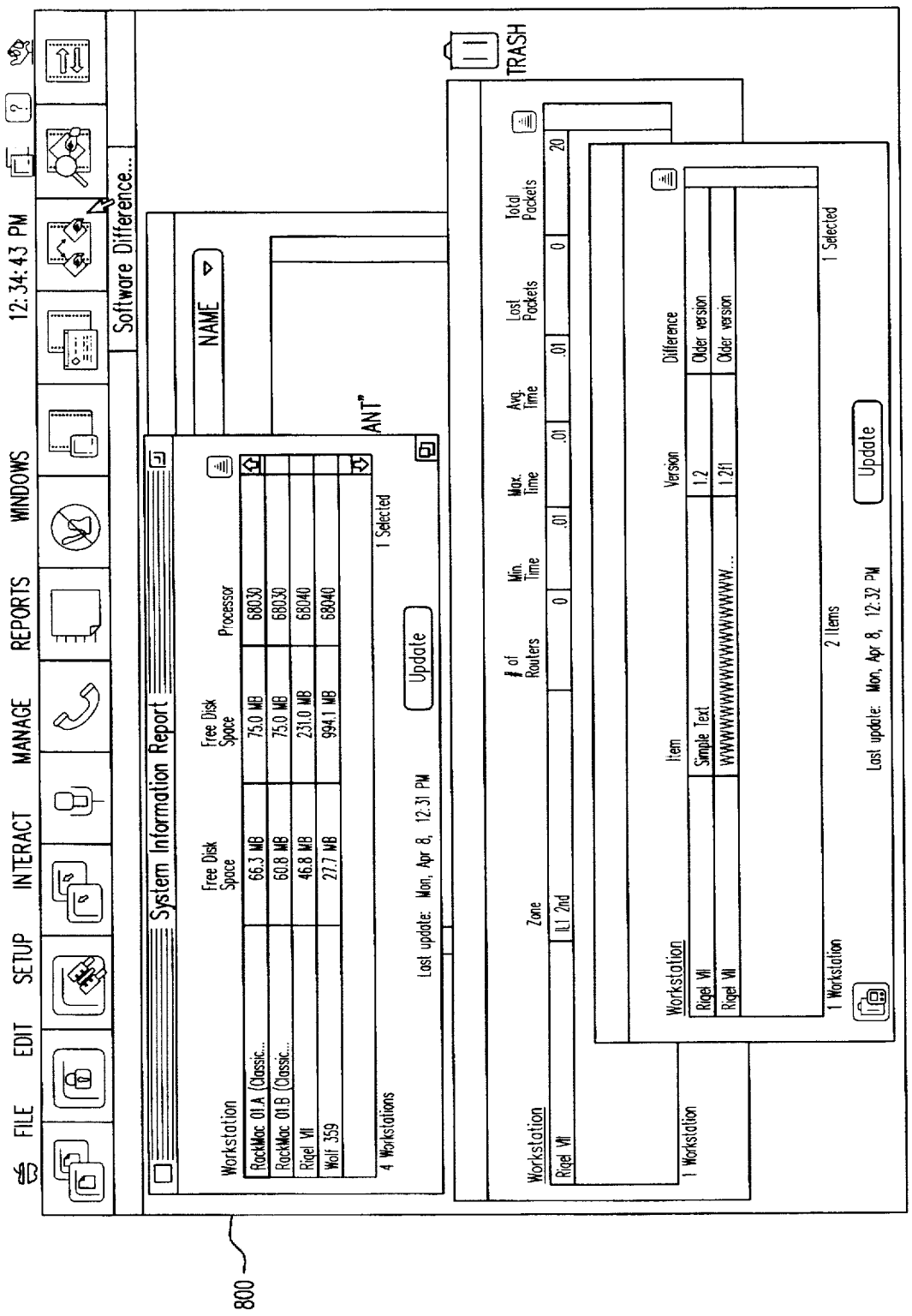
FIG. 8 is an example of a system information report on a master workstation screen, wherein the report contains information concerning multiple workstations.

FIG. 7 depicts a system information report screen illustrating the case where the administrator has selected: operating system version, virtual memory, system memory, free disk space, processor, and monitor size for the network workstation "Wolf 359". An example of a report where system attributes for more than one workstation are simultaneously displayed is shown in a system information report window 800 in FIG. 8.

Figures 9, 10:
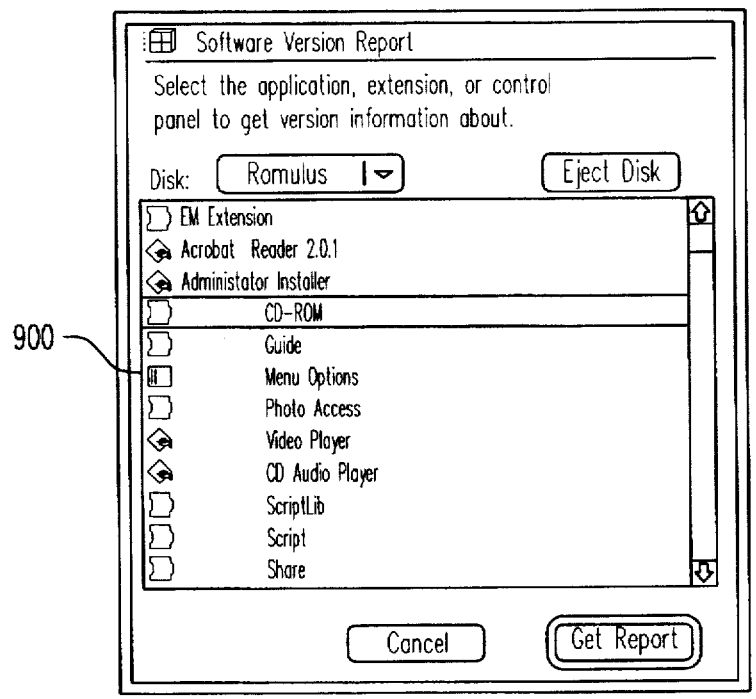
FIG. 9 is a Software Version Report request dialog box.
FIG. 10 is an example of a software version report.
Figure 11:
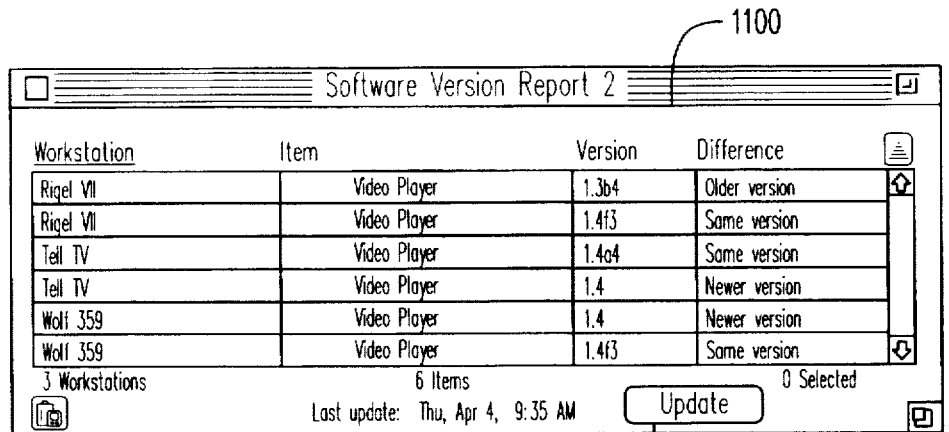
FIG. 11 is an example of a software version report having an update button.

A second type of report is a software version report. The software version report, as its name implies, generates a report containing version information for selected software applications residing on selected workstations. When an administrator initiates the construction of a software version report for one or more workstations, a window (or dialog box), such as the screen window depicted in FIG. 9, is displayed showing the software applications residing on a selected workstation(s). Referring to the figure, a system information dialog box 900 for a disk, "Romulus," on a network workstation, indicates the software applications found on the workstation that can be selected for depiction in a software version report. FIG. 10 depicts an exemplary software version report screen illustrating the case where the administrator has selected to display software attributes for two programs, e.g. Simpletext and Teachtext, for a variety of network workstations. FIG. 11 illustrates a software version report screen having an update feature whereby an administrator can automatically update the report contents by selecting an update button 1102 that appears within the software version report window 1100.

Figure 12:
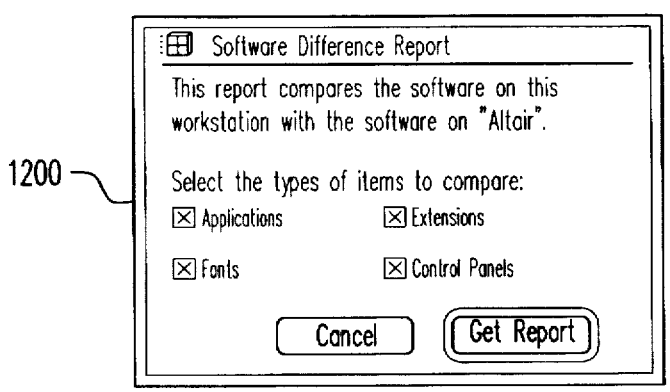
FIG. 12 is a Software Difference Report request dialog box.

A third type of report is a software difference report. The software difference report generates a report setting out software differences between software applications on a master workstation and the same applications, if any, on selected network workstations. This feature provides a simple means for an administrator to determine the software differences between the master workstation and one or more selected network workstations. A dialog box 1200 for initiating a software difference report between a master workstation and a network workstation "Altair" is depicted in FIG. 12. As shown in the figure, an administrator can select to generate a report that sets out the differences in various items such as applications, fonts, extensions, and control panels, for example, between the master workstation and the Altair workstation. Of course further differential aspects can be included (e.g., shutdown and startup items) as depicted in the software difference report dialog box of FIG. 14.

A difference report generated for Altair is depicted in FIG. 13. The report lists the name of the network workstation, the name of an item, a kind of item (e.g., application, extension, etc.), a version number, and a difference. The "items" are the items selected by a user in the software difference dialog box (i.e., FIG. 12) that are found on the master workstation. These items are compared to similar items, if any, found on the selected workstation(s). The difference heading indicates the results of the comparison. For the "EM extension" item listed at the top of the software difference report depicted in FIG. 13, the difference heading indicates that the item is installed on the master workstation, but is "not installed" on the Altair workstation. Further down in the report, the "Event Manager" item is indicated as being "Extra" which is indicative of the item appearing on Altair, but not on the master workstation. FIG. 15 illustrates a software difference report screen having an update feature whereby an administrator can automatically update the report contents by actuating an update button 1502 that appears within the software version report window 1500.

Figure 24:
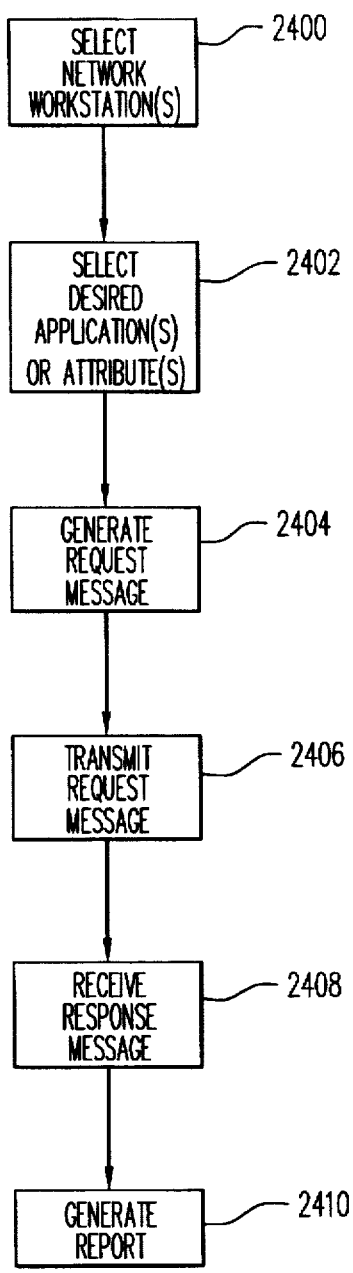
FIG. 24 is a flow diagram of a report generation process in accordance with the invention.

Generation of the aforementioned reports can be achieved through the use of dialog boxes, selective messaging and report generation software. Referring to FIG. 24, when an administrator selects a report to be generated, one or more dialog boxes are presented wherein the administrator can select the network workstations to which the reports are directed (block 2400), and wherein the administrator can select the attributes or software applications to be investigated (block 2402). From the dialog box selections, the master workstation generates report request messages (block 2404) that are directed to the selected network workstations (block 2406). The report request messages contain inquiries directed to the attributes to be presented in the report. A network workstation upon receiving such a report request message determines if the master workstation is suspect and if not, conducts an investigation, and generates a report response message that is sent back to the master workstation. The investigation pursuant to a request and generation of a report response message can be conducted during idle processing periods in the network workstation. When the report response information is received by the master workstation (block 2408), the master workstation compiles it into an appropriate report (block 2410), thereby allowing the administrator to review a wide variety of selected attributes for a wide variety of selected network workstations in a single report.

The aforedescribed reports are exemplary of some of a wide variety of features made available to an administrator. These and other features can be launched from a main screen of a master workstation, or any computer, by selecting an appropriate icon in a toolbar. However, the amount of screen space is typically limited, thereby restricting the number of icons that can be displayed at any one time. In a preferred embodiment of the present invention, a toolbar displayable on the main screen is arranged to permit a maximum number of icons to be displayed for a given amount of screen space. The toolbar arrangement in accordance with exemplary embodiments of the invention allows for enhanced ease of use while still maintaining screen space for use in presenting menus, observation screens, and the like. Toolbar icons, in accordance with a preferred embodiment, are displayed in a horizontal orientation on a screen, and are organized to display a maximum number of icons for a given space achieved by arranging them in a contiguous abutting manner.

Because there are now a large number of different icons that can represent the many features presently available, it is difficult for users to memorize what function is attributed to each of the icons that can make up a toolbar. Consequently, it is desirable to provide a user with some means of identifying icon function beyond the icon symbol itself. Icon function is described, in accordance with the present invention, by pairing icon symbols with an icon text description, or icon descriptor. In a preferred embodiment, the icon descriptor resides directly beneath the icon in the toolbar. However, the icon descriptors can appear above, or even next to the icons in a vertically arranged toolbar.

Because in the preferred embodiment the icons in the toolbar are arranged in a contiguous manner, the icon descriptors, in many cases, overlap when the icon function text description is greater than the width of an individual icon. Consequently, the icon descriptors are truncated to a text portion that can fit within the width of an individual icon. The exposed portion of the icon descriptor can be the first portion of icon description text, an acronym, a selected identifying word, or any combination of the latter, that can allude to an icon's function.

In a preferred embodiment, when a cursor indicator is positioned over an icon by mouse action or other cursor control mechanism, the icon descriptor for the selected icon is expanded to its full text, while icon descriptors for unselected icons are blanked. As will be familiar to those skilled in the art, indication of icon selection may require the cursor indicator to remain over the icon for a brief period of time.

An exemplary toolbar 410 is depicted in FIG. 4. The toolbar 410 is comprised of thirteen icons in the depicted arrangement. The number of icons that can be simultaneously displayed may be governed by the width of a workstation monitor screen. The depicted toolbar contains icons for the administrative features: share screen 412, lock screen 414, observe 416, control 418, announce 420, talk 422, send text message 424, clear attention 426, delete selected item 428, delete hard drive 430, open application 432, open item 434, and restart 436. It is readily apparent, however, that the foregoing full text descriptions of the icons cannot appear beneath their respective icons without overlapping. Consequently, the respective icon descriptors: Share, Lock, Observe, Control, Announce, Talk, Message, Clr Attn, Delete, Del HD, Open App, Open Item, and Restart appear below the aforementioned icons.

As shown in FIG. 16, if a cursor indicator is placed over an icon such as Message 424 for a sufficient period of time (e.g., 0.1 second), the partial text descriptor expands to the full text icon description 1602 of "Send Text Message." This permits a user to fully ascertain the function of the icon if he or she is unfamiliar with the icon itself, or the partial text icon descriptor. When the icon is actuated by pressing a button on a mouse, for example, the icon is highlighted as shown in FIG. 17. Releasing the mouse button while the cursor indicator remains over the icon can launch the corresponding function (i.e., the send text message function). For further information relating to the operation of the toolbar, reference is made to copending, commonly assigned application Ser. No. 08/644,370 [Attorney Docket No. P1917-418], the disclosure of which is incorporated herein by reference.

Figure 18:
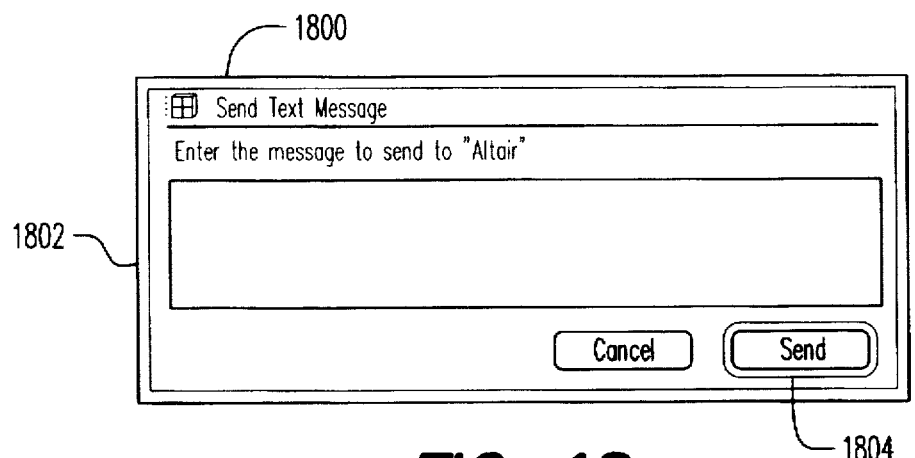
FIG. 18 is the send text message dialog box presented in response to the selection of the icon of FIGS. 16 and 17.
Figure 19:
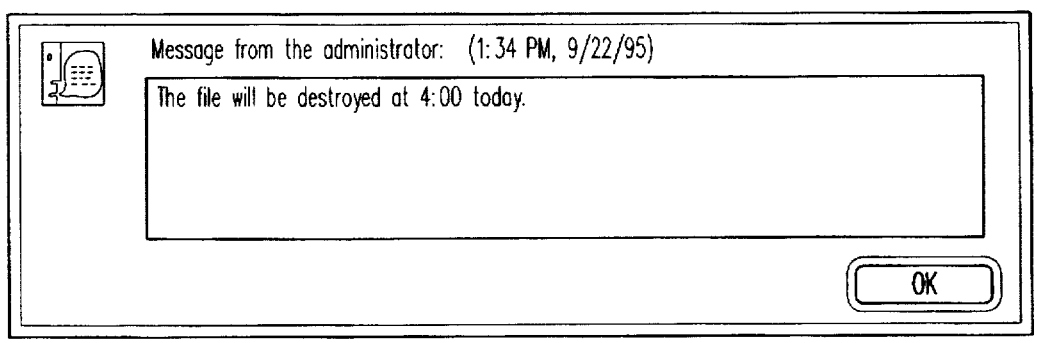
FIG. 19 is an illustration of the message box presented to a user by the administrator.

When the send text message icon is actuated, a dialog box 1800 is presented to a user, as is shown in FIG. 18. A user typically selects a destination workstation prior to activating the message toolbar icon. In the depicted case, the dialog box invites the user to enter a text message for the selected workstation (e.g., "Altair") in the message space 1802. After the message has been composed, the user can actuate the send button 1804 to send the message. In response, a message dialog box, such as the one depicted in FIG. 19, may appear on the screen of the Altair workstation.

The other administrative tools mentioned briefly above that can be invoked by icons include the share screen button (see 412, FIG. 4) which permits an administrator to place a selected screen display on the screens of selected network workstations. The lock screen button 414 is provided that locks and blanks out network workstation screens while, for example, an administrator lectures to users in a classroom. An observe button 416 allows an administrator to view the screen that appears on a selected network workstation. If only one workstation is selected prior to invoking the observe feature, the screen from that workstation will be reproduced at the administrator's workstation in full size, so that it covers the administrator's entire screen. If more than one workstation is selected for observation, the selected workstations are grouped in sets, e.g. four per set. The screens for all of the workstations in a group are shown simultaneously on the administrator's screen, with each display being compressed to 25% of its original size if there are four workstation's per set.

If more workstations are selected than can be shown at one time, the system continually cycles through the various groups, with each group being displayed for a predetermined period of time that can be adjusted by the administrator. Thus, in the example given above, if five workstations are selected by the administrator, the first four are presented as one group, and then the fifth workstation is presented by itself as the sole member of a second group. If desired, when a group consists of only one workstation, its screen can be shown in a full-size format, rather than compressed. Information regarding the observe feature is set out in greater detail in U.S. patent application Ser. No. 08/280,333, which is incorporated herein by reference.

The control icon 418 enables the administrator to control a selected network workstation. When this icon is actuated, a screen sharing program at the selected workstation captures the screen information and transmits it to the master workstation. Keystrokes and cursor actions that are input at the master workstation are transmitted to the selected workstation, so that both the selected workstation and the master workstation are controlled by the administrator.

An announce icon 420 enables the administrator to make audio announcements to one or more network workstations designated by selecting them in, for example, the status window 400. After selecting the appropriate workstations and activating the announce icon 420, the administrator can speak into a microphone at the master workstation to provide a one-way communication that can be used to explain material to users at the selected workstations, for example.

A talk button 422 operates in a similar manner, except that it permits a two-way conversation to be carried out between the administrator and a single selected network workstation user. In carrying out either of the announce or talk functions, the sounds spoken into the microphones at the administrator's and user's workstations are digitized at the originating workstation and then transmitted to the receiving workstation over the digital data network 222, where they are converted to analog signals and played back over speakers or headphones associated with that workstation.

Figure 20:
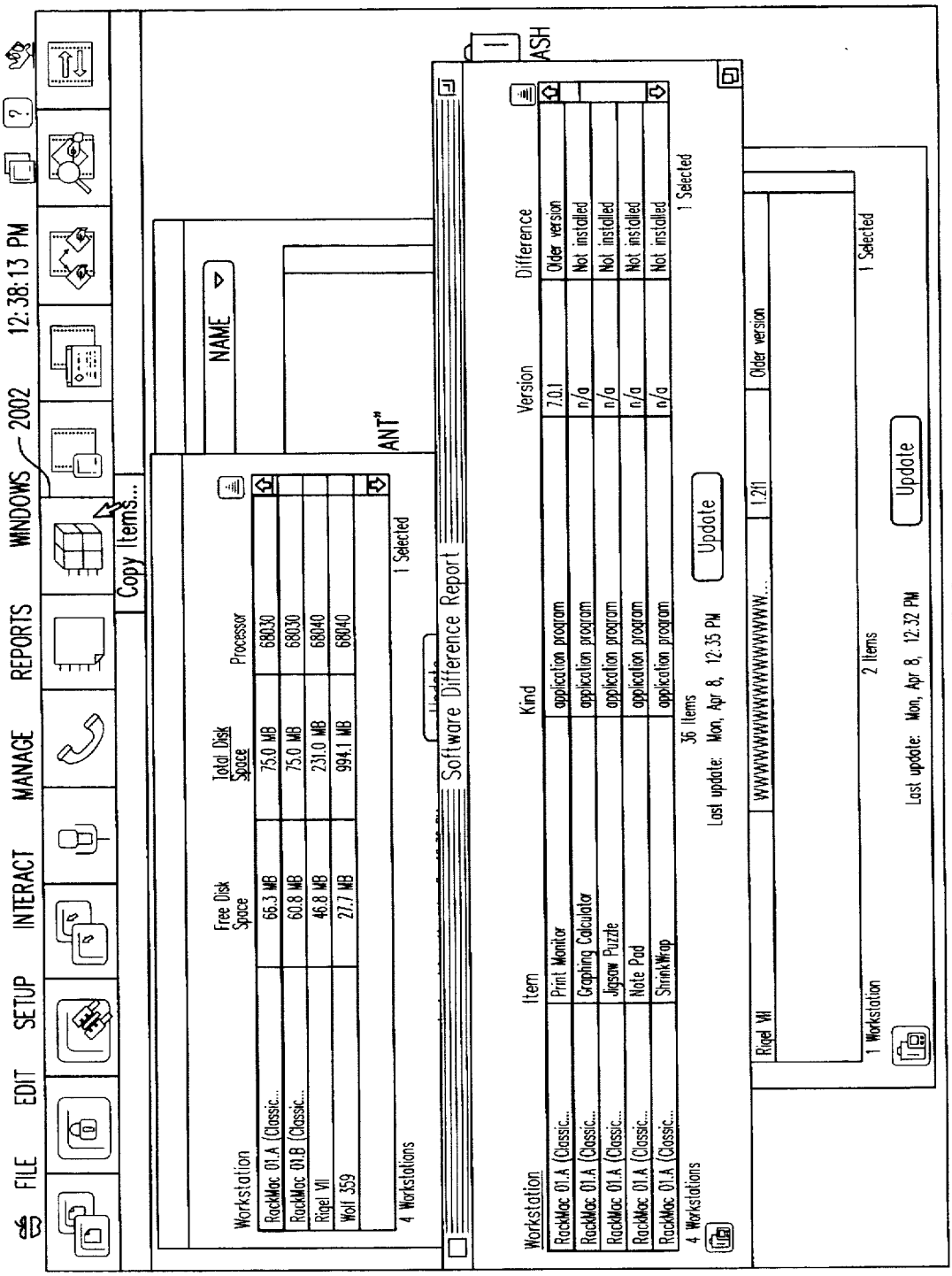
FIG. 20 is an illustration of a master workstation screen having the Copy Items icon selected.

A clear attention icon 426 resets an attention indicator 438 (see FIG. 4). The attention indicator 438 notifies an administrator that a user operating a network workstation has requested attention. The administrator can respond by selecting the workstation requesting attention and then selecting, for example, the talk button 422. The delete selected item button 428, as its name implies, performs the function of deleting a selected item, while the delete hard drive button 430 deletes the contents of a hard drive for a selected workstation. An open application icon button 432 opens a master workstation application, while the open item icon button 434 opens a selected item on a network workstation. The restart button 436 restarts a selected network workstation. The restart may be used in a case where, for example, the administrator has copied a new version of a system application to a network workstation (using a copy items icon 2002—see FIG. 20), and desires to boot-up the workstation so that it runs the new version of the system application.

Figure 21:
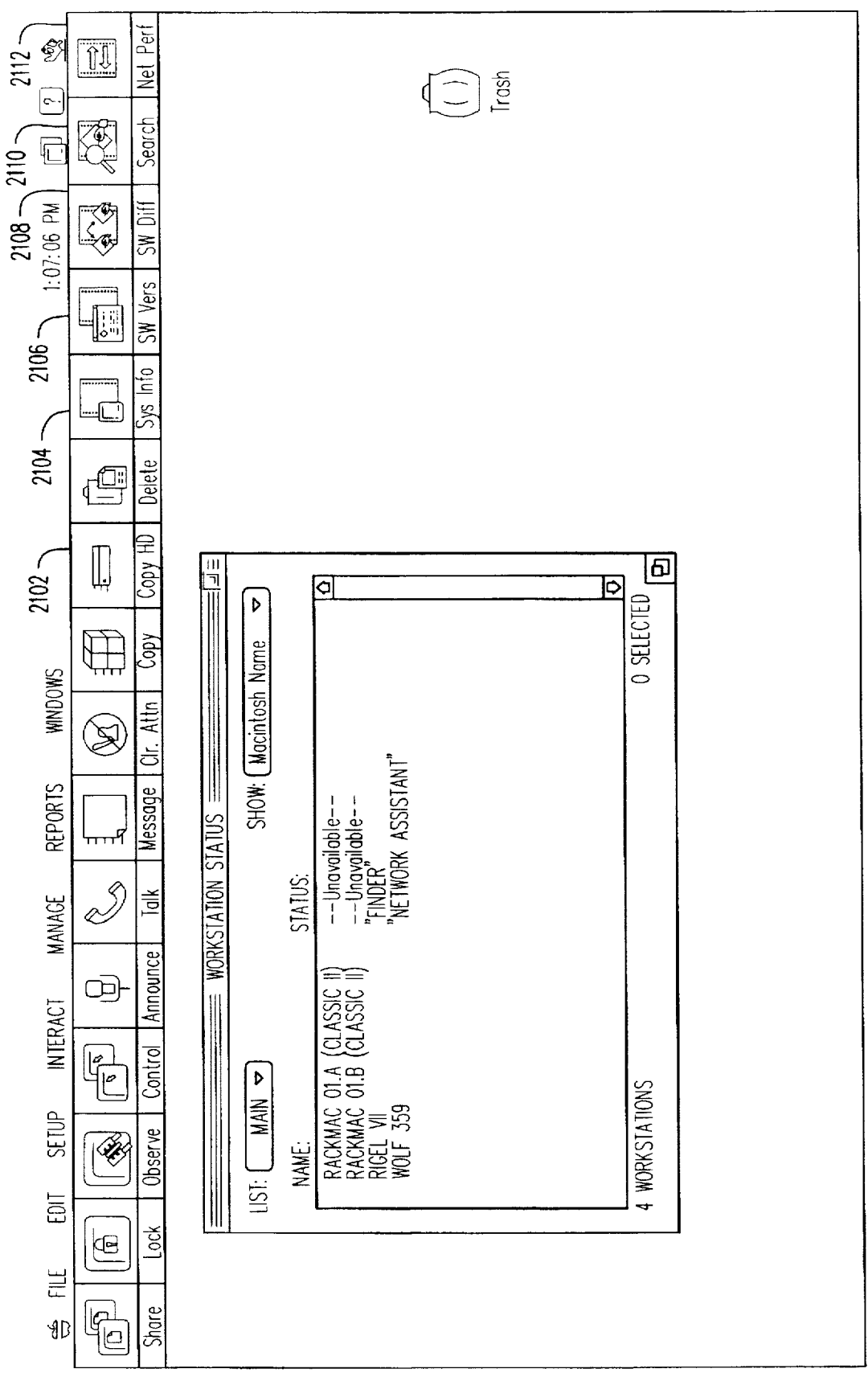
FIG. 21 is an illustration of a large screen having a corresponding number of icons in its toolbar.
Figure 23:
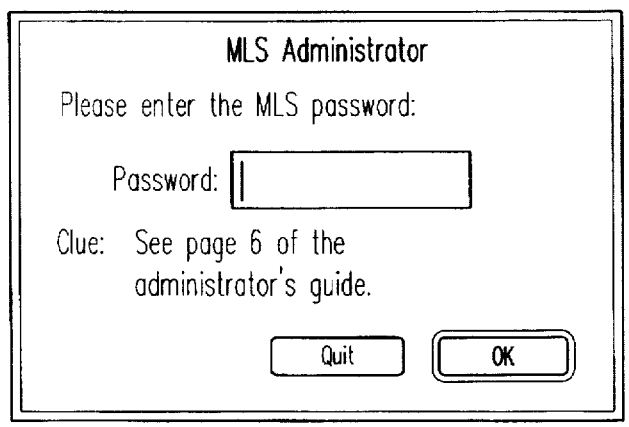
FIG. 23 is a password request dialog box.

Referring to FIG. 21, other command icon buttons, such as system information report 2104, software version report 2106, and software difference report 2108 can be used to initiate the generation of reports, as discussed above. The copy hard disk 2102 copies the contents of a hard disk between selected workstations. The software search command 2110 is similar in function to a find file command, but provides additional searching features affiliated with a network environment, such as searching within remote network workstations. The network performance button 2112 initiates a function whereby throughput and other performance attributes of a network can be gauged.

Figure 22:
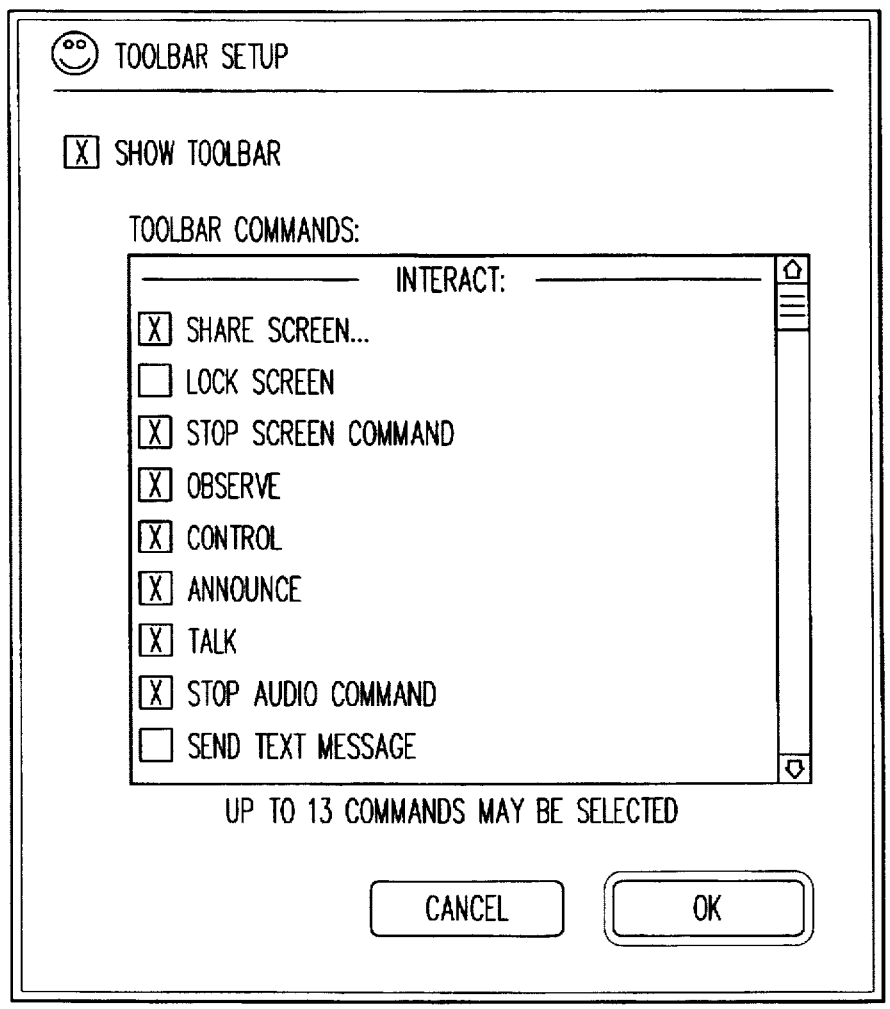
FIG. 22 is an illustration of a toolbar set up dialog box in accordance with another aspect of the invention.

The foregoing is not an exhaustive list of administrative functions available to an administrator. Other commands such as, for example, quit application, shut down, change system settings, and rebuild desktop can also be made available to a user or administrator through toolbar activation. In a preferred embodiment of the invention, the toolbar can be configured in accordance with the desires of an administrator. That is, the administrator can select the icon buttons that appear in a toolbar. The number of icon buttons that can be selected may be limited by the width of a given workstation screen. A dialog box for selecting icons to appear in the toolbar is shown in FIG. 22. In the exemplary embodiment shown in FIG. 4, the number of icons that can be selected for the toolbar is limited to thirteen. For larger screens, such as the screen depicted in FIG. 21, a larger number of icons can appear in a toolbar.

From the foregoing, it can be seen that the present invention provides a number of features which provide flexible security while facilitating control of networked multimedia workstations. Although specifically described in the context of a system employed within a classroom or computer laboratory setting, it can be seen that the features of the invention have applicability in a much larger variety of network environments.

The invention has been described with reference to particular embodiments. However, it will be readily apparent to those skilled in the art that it is possible to embody the invention in specific forms other than those of the preferred embodiments described above. For example, the entire process may be carried out by an article of manufacture in a general purpose or application specific processing unit or computer. Hence, the invention can be embodied in the form of an article of manufacture as a machine readable medium such as floppy disk, computer tape, hard drive disk, CD ROM, RAM, or any other suitable memory medium. Embodied as such, the memory medium contains computer readable program code which causes a computing system upon which a system in accordance with the invention is running to function or carry out processes in accordance with the claimed invention. This may be done without departing from the spirit of the invention.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. In a networked computer system having at least one master workstation and a plurality of network workstations, a method for validating the master workstation to a network workstation in response to a denial of access by the network workstation, comprising the steps of:

storing a plurality of candidate passwords at the master workstation; and automatically transmitting the candidate passwords to the network workstation in succession until one of said passwords is accepted at the network workstation.

2. The method claimed in claim 1 wherein the candidate passwords include a password entered for a network workstation when the network workstation was connected to the network.

3. The method claimed in claim 1 wherein the candidate passwords include a null password.

4. The method claimed in claim 1 wherein the candidate passwords include an administrator's password.

5. The method claimed in claim 1 further comprising the step of:
   prompting an administrator to enter a password in the event that none of the candidate passwords is successful in validating the master workstation to the network workstation.

6. The method claimed in claim 5 further comprising the step of:
   adding the password entered by the administrator to the plurality of candidate passwords.

7. The method claimed in claim 1 wherein the step of sending passwords is performed in a fashion that is transparent to a user operating the master workstation.

8. The method claimed in claim 1 wherein the denial of access is a result of the network workstation determining that the master workstation is suspect.

9. The method claimed in claim 8 wherein the master workstation is determined to be suspect because a predetermined amount of time elapsed between receipt of consecutive master workstation request messages at the network workstation.

10. The method claimed in claim 8 wherein the master workstation is determined to be suspect because a task associated with a master workstation request message requires a predetermined level of administrative access.

11. In a networked computer system, a method for providing security in a network workstation, comprising the steps of:
   monitoring request messages from a master workstation;
   determining whether the master workstation is suspect;
   issuing a validation challenge to the master workstation in response to a request message if the master workstation is found to be suspect; and
   assessing the validity of each password in a series of password candidates automatically sent by the master workstation to the network workstation in response to the challenge.

12. The method claimed in claim 11 wherein the determination of whether the master workstation is suspect includes assessing whether a predetermined period of time has elapsed between receipt of status request messages.

13. The method claimed in claim 11 wherein the determination of whether the master workstation is suspect includes assessing whether a performance of a task within a request message received by the network workstation requires a predetermined level of administrative access.

14. In a networked computer system, a method for validating a master workstation, the method comprising the steps of:
   sending a request message from the master workstation to a network workstation;
   determining, within the network workstation, whether a the master workstation requires validation before a task associated with the request message is carried out;
   issuing a challenge to the master workstation if the master workstation is determined to require validation; and
   automatically sending a series of password candidates from the master workstation to the network workstation in response to the challenge.

15. The method claimed in claim 14 wherein the series of password candidates includes a password entered for a network workstation when the network workstation was connected to the network.

16. The method claimed in claim 14 wherein the series of password candidates includes a null password.

17. The method claimed in claim 14 wherein the series of password candidates includes an administrator's password.

18. The method claimed in claim 14 further comprising the step of:
   prompting an administrator to enter a password in the event that none of the series of passwords is successful in validating the master workstation to the network workstation.

19. The method claimed in claim 18 further comprising the step of:
   adding the password entered by the administrator to the series of password candidates.

20. The method claimed in claim 14 wherein the determination of whether the master workstation requires validation includes assessing whether a predetermined period of time has elapsed between receipt of status request messages.

21. The method claimed in claim 14 wherein the determination of whether the master workstation requires validation includes assessing whether a performance of a task within a request message received by the network workstation requires a predetermined level of administrative access.

22. In a networked computer system, a method for validating a master workstation, the method comprising the steps of:
   issuing a challenge message to the master workstation when the network workstation wants to send a request message to the master workstation;
   automatically sending a series of one or more password candidates from the master workstation to the network workstation in response to the challenge message; and
   determining, within the network workstation, whether any of the series of password candidates are valid.

23. In a networked computer system having at least one master workstation and a multiplicity of network workstations, a method for maintaining an active link between the master workstation and the network workstations, comprising the steps of:
   broadcasting a request message from the master workstation to a network workstation;
   receiving the request message in the network workstation;
   determining whether a predetermined amount of time has elapsed since a previous status request message was received;
   sending a challenge message to the master workstation in response to the status request if the predetermined period amount of time has elapsed;
   responding to the challenge message by automatically returning a stored password maintained in the master workstation which stored password is particular to the network workstation issuing the challenge message;
   responding to the challenge message by automatically returning a null password if the stored password is not accepted;
   responding to the challenge message by automatically returning an administrative password associated with the master workstation if the null password is not accepted; and
   prompting a user operating the master workstation to enter a password if the administrative password associated is not accepted.

24. A system for providing security in a network workstation, the system comprising:

means for monitoring request messages from a master workstation;

means for determining whether a the master workstation is suspect;

means for issuing a validation challenge to the master workstation in response to a status request message if the master workstation is found to be suspect; and means for monitoring a series of password candidates automatically sent by the master workstation to the network workstation in response to the validation challenge.

25. An article of manufacture for use in a network workstation comprising a computer usable medium having computer readable program code means for causing the network workstation to:

monitor request messages from a master workstation;

determine whether a the master workstation is suspect;

issue a validation challenge to the master workstation in response to a status request message if the master workstation is found to be suspect; and monitoring a series of password candidates automatically sent by the master workstation to the network workstation in response to the validation challenge.

* * * * *